(12) United States Patent
Booth

(10) Patent No.: US 9,662,594 B2
(45) Date of Patent: May 30, 2017

(54) SYSTEMS AND METHODS FOR TREATING FRACTIONATED WATER

(75) Inventor: Donald Booth, Charleston, WV (US)

(73) Assignee: NG Innovations, Inc., Cross Lanes, WV (US)

( * ) Notice: Subject to any disclaimer, the term of this patent is extended or adjusted under 35 U.S.C. 154(b) by 658 days.

(21) Appl. No.: 12/693,098

(22) Filed: Jan. 25, 2010

(65) Prior Publication Data

US 2010/0320073 A1 Dec. 23, 2010

Related U.S. Application Data

(60) Provisional application No. 61/219,014, filed on Jun. 22, 2009.

(51) Int. Cl.
*B01D 1/00* (2006.01)
*B01D 1/24* (2006.01)

(52) U.S. Cl.
CPC ..................................... *B01D 1/24* (2013.01)

(58) Field of Classification Search
CPC ................ B01D 3/06; B01D 1/24; B01D 1/00
USPC ............ 203/88, 99; 202/152–176; 159/5–15, 159/26.1–27.5, 28.5; 166/259, 265–267, 166/270.1, 271
See application file for complete search history.

(56) References Cited

U.S. PATENT DOCUMENTS

| | | | |
|---|---|---|---|
| 4,026,791 A | 5/1977 | Wallace | |
| 4,324,292 A | 4/1982 | Jacobs et al. | |
| 4,495,056 A | 1/1985 | Venardos et al. | |
| 4,560,812 A | 12/1985 | Blytas | |
| 4,752,399 A | 6/1988 | Viator et al. | |
| 4,765,910 A | 8/1988 | Wolf | |
| 4,895,665 A | 1/1990 | Colelli et al. | |
| 4,950,311 A | 8/1990 | White, Jr. | |
| 4,994,169 A | 2/1991 | Godino et al. | |
| 5,132,025 A | 7/1992 | Hays | |
| 5,156,706 A | 10/1992 | Sephton | |
| 5,422,012 A | 6/1995 | Adams | |
| 5,895,565 A | 4/1999 | Steininger et al. | |
| 5,986,133 A | 11/1999 | Holtzapple et al. | |
| 6,001,246 A * | 12/1999 | Suenkonis | ..................... 210/180 |
| 6,340,373 B1 | 1/2002 | Billington | |
| 6,508,916 B1 | 1/2003 | Razzaghi et al. | |
| 6,536,523 B1 | 3/2003 | Kresnyak et al. | |
| 6,606,862 B1 * | 8/2003 | Wallace | ................ F01K 17/025 60/39.182 |
| 6,673,249 B2 | 1/2004 | Max | |
| 6,730,234 B2 | 5/2004 | Symens | |
| 6,762,154 B2 | 7/2004 | Lungwitz et al. | |
| 6,834,720 B1 * | 12/2004 | Dwyer et al. | .................. 166/289 |
| 6,984,292 B2 | 1/2006 | Kresnyak et al. | |
| 7,311,145 B2 | 12/2007 | Lehman et al. | |
| 7,331,389 B2 | 2/2008 | Lehman et al. | |

(Continued)

FOREIGN PATENT DOCUMENTS

EP 0936344 A2 8/1999

*Primary Examiner* — T. Bennett McKenzie
(74) *Attorney, Agent, or Firm* — Dinsmore & Shohl, LLP; Monika L'Orsa Jaensson, Esq.

(57) ABSTRACT

One embodiment of a method of water treatment comprising straining fractionated water to remove particles larger than one micron in diameter, decanting the strained fractionated water to remove surfactants and oil, evaporating the decanted water to provide concentrated brine and water vapor, and condensing the water vapor.

9 Claims, 2 Drawing Sheets

(56) References Cited

U.S. PATENT DOCUMENTS

| | | |
|---|---|---|
| 7,416,668 B1 | 8/2008 | Theodore |
| 7,429,332 B2 | 9/2008 | Surjaatmadja et al. |
| 7,510,656 B2 | 3/2009 | Shafer et al. |
| 7,622,044 B2 | 11/2009 | Grott |
| 2002/0134550 A1 | 9/2002 | Leeson et al. |
| 2003/0164235 A1 | 9/2003 | Leeson et al. |
| 2003/0168410 A1 | 9/2003 | Robicheaux et al. |
| 2004/0031743 A1 | 2/2004 | Roberts et al. |
| 2004/0112836 A1 | 6/2004 | Manz et al. |
| 2004/0195084 A1* | 10/2004 | Hetherington et al. .......... 203/2 |
| 2004/0245084 A1* | 12/2004 | Bethge .................. B01D 1/065 |
| | | 202/172 |
| 2005/0040111 A1* | 2/2005 | Dale ............................. 210/683 |
| 2005/0098504 A1 | 5/2005 | Manz et al. |
| 2005/0279500 A1* | 12/2005 | Heins ........................ C02F 1/04 |
| | | 166/266 |
| 2007/0051513 A1 | 3/2007 | Heins |
| 2007/0056913 A1 | 3/2007 | Burt |
| 2007/0102359 A1 | 5/2007 | Lombardi et al. |
| 2008/0073200 A1 | 3/2008 | Godshall et al. |
| 2008/0156709 A1 | 7/2008 | Johnson |
| 2008/0188382 A1* | 8/2008 | Thompson et al. .......... 507/251 |
| 2008/0237141 A1 | 10/2008 | Kerfoot |
| 2008/0277318 A1 | 11/2008 | Bozak et al. |
| 2009/0050572 A1 | 2/2009 | McGuire et al. |
| 2009/0082906 A1 | 3/2009 | Sanderson et al. |
| 2009/0090473 A1* | 4/2009 | Fielding et al. ................ 159/46 |
| 2009/0101572 A1 | 4/2009 | Sullivan et al. |
| 2009/0166170 A1 | 7/2009 | Sun |
| 2009/0230059 A1 | 9/2009 | McGuire et al. |
| 2009/0236281 A1 | 9/2009 | Shafer et al. |
| 2009/0313996 A1* | 12/2009 | Riley ..................... B01D 1/225 |
| | | 60/648 |
| 2010/0196981 A1* | 8/2010 | Aharon .................... C02F 9/00 |
| | | 435/165 |

* cited by examiner

SYSTEMS AND METHODS FOR TREATING FRACTIONATED WATER

CROSS-REFERENCE TO RELATED APPLICATIONS

This application claims the benefit of U.S. Provisional Application Ser. No. 61/219,014, filed Jun. 22, 2009.

BACKGROUND

Embodiments of the present invention generally relate to systems and methods for the treatment of fractionated water, and specifically relate to systems and methods utilizing decanting and evaporation processes to recover reusable salt and brine products.

Hydraulic fracturing is a process applied to drilled oil and gas well holes to improve the ability of fluids (such as oil and gas) to flow from the petroleum bearing formation to the drill hole. It involves injecting high pressure fracturing fluid into the rock formation with various additives, thereby causing the formation to fracture circumferentially away from the hole. During the fracturing process, the injected fracturing fluid is recovered, while the oil and gas flows from the rock formation into the drill hole and up to the well surface. The fracturing process is often necessary for economical well production.

The fractionation of water results from the fracturing process, specifically, the chemical additions that are typically used as part of the fracturing process. In the fracturing process, sand is forced under pressure into the cracks that are pressure induced into the oil or gas underground formation. The sand is carried deep into the cracks of the formation by a viscous gel. The gel is "broken" to allow the release of sand at the sand's point of furthest ingress into the formation crack. Typically, the breaking process is initiated by an enzyme breaker. Upon breaking, the fractionated water is removed from the well, and may be treated with one or more treatment methods.

Many oil and natural gas operations generate significant quantities of fractionated water, in addition to their desired hydrocarbon products. Typically, fractionated water is contaminated with significant concentrations of chemicals that require treatment before the water may be reused or discharged to the environment. Fractionated water may contain natural contaminants that are mixed with the water as a result of the fracturing process, such as hydrocarbons and inorganic salts. It may also contain synthetic contaminants, such as spent fracturing fluids including polymers and inorganic cross linking agents, polymer breaking agents, friction reduction chemicals, and lubricants. These synthetic contaminants, which are utilized in the drilling process, remain in the fractionated water upon extraction to the surface.

One method that has traditionally been used to treat fractionated water is placing it in large evaporation ponds to isolate the contaminants for later removal. However, the practice of discharging fractionated water to evaporation ponds has been recently identified as wasteful in regards to the potential benefits that might accrue from alternative uses of the water, and land.

Another disposal method that has been used for treatment of fractionated water is deep-well disposal. The advantage to deep-well disposal is that it does not waste valuable surface land area. However, deep-well disposal still results in wasting large quantities of fractionated water. Since water has become recognized as a valuable and limited resource, such wasting has become closely scrutinized. An additional disadvantage of deep-well disposal of production waters is the high cost to transport the water to the deep-well sites.

Because the limited petroleum product supply is predicted to continue, the oil and gas industry has determined that waste minimization and fractionated water treatment is the path to increased hydrocarbon production profitability and an improved social profile.

Although there is a need to efficiently treat fractionated waters, there are few economically viable and effective water treatment technologies from which to choose. The fractionated waters are typically laden with dissolved solids, and characterized as "brackish" waters. The treatment of the fractionated water produced by oil-gas wells has been difficult using conventional pure water extraction processes, such as membrane desalinization. The treatment of fractionated water often results in the fouling of the membrane surface coating, which limits the rate of permeate production, and frustrates effective water treatment.

Accordingly, there remains a need for systems and methods to treat fractionated water to produce a reusable brine, without wasting valuable byproducts. Embodiments of the present invention provide a method to treat fractionated water to recover a brine and a recovered salt stream, and a corresponding apparatus.

SUMMARY OF INVENTION

A method for treating fractionated water produced by hydraulic fracturing comprising straining fractionated water to remove particles larger than one micron in diameter, decanting the strained fractionated water to remove surfactants and oil, evaporating the decanted water to provide concentrated brine and water vapor, and condensing the water vapor.

Optionally, the evaporating step may further comprise tangentially feeding decanted water, washing a tube sheet, and flashing a portion of the decanted water to allow solute particles to precipitate.

A method for treating fractionated water produced by hydraulic fracturing comprising straining the fractionated water to remove solids larger than 1 micron in diameter, decanting the strained feed water to remove surfactants and hydrocarbons, filtering the decanted water, evaporating the filtrate in an evaporator to provide a concentrated brine, and condensing the water vapor to provide water having a concentration of total dissolved solutes ranging from about 75 to about 225 ppm, and pH ranging from about 6 to about 7.

In another embodiment, an apparatus for water treatment comprising a strainer operable to remove solids greater than 1 micron in diameter from a fractionated water, a decanter in fluid communication with the strainer operable to separate a recovered oil-surfactants from the strained feed water, at least one evaporator in fluid communication with the decanter operable to evaporate water from the decanted water, and a dewatering conveyor operable to receive the concentrated brine, and produce a salt product.

These and additional objects and advantages provided by the embodiments of the present invention will be more fully understood in view of the following detailed description, in conjunction with the drawings.

BRIEF DESCRIPTION OF THE DRAWINGS

The following detailed description of the embodiments of the present invention can be best understood when read in conjunction with the following drawings, where like structure is indicated with like reference numerals, and in which.

Figure 1:
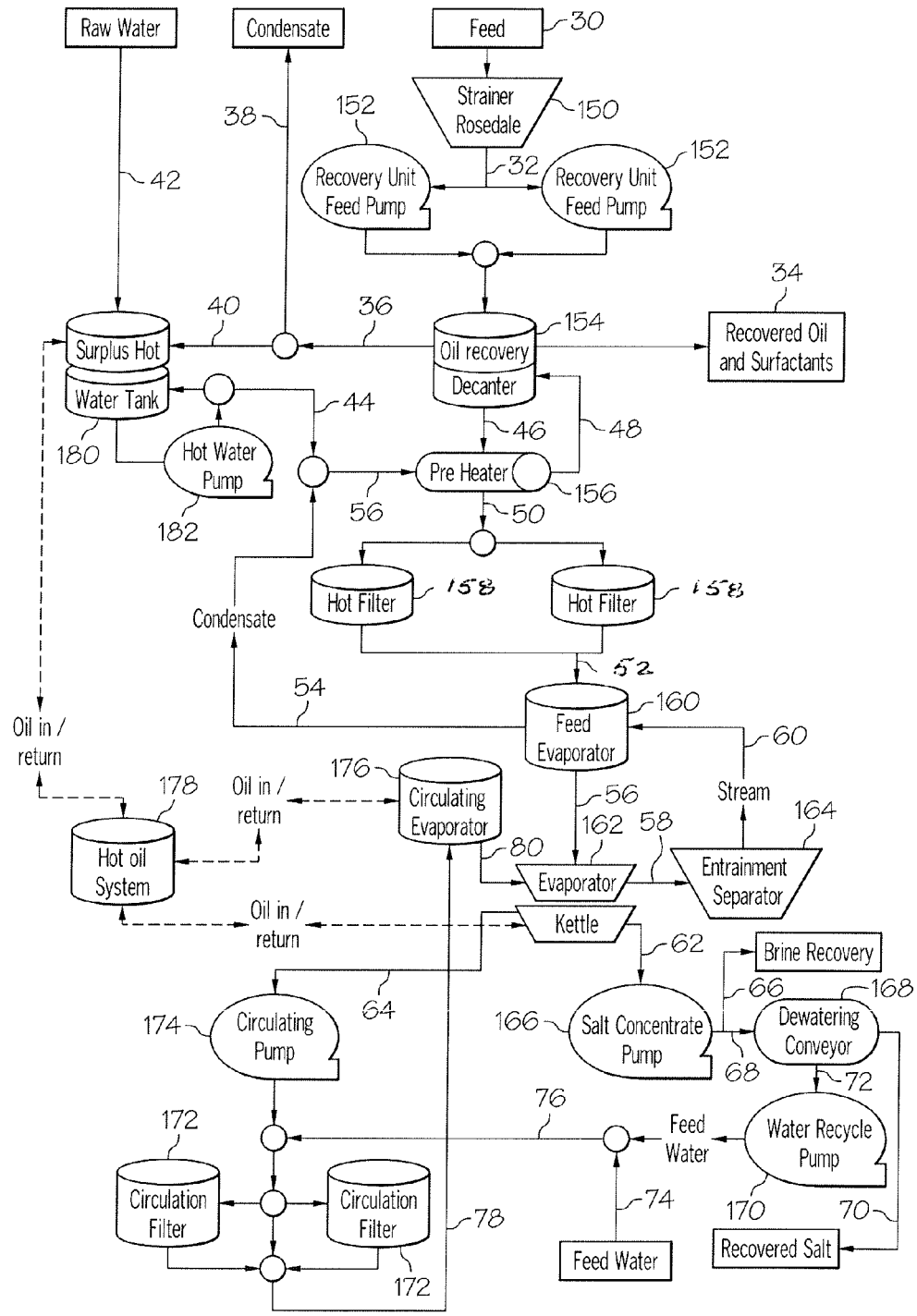
FIG. 1 shows a flow diagram illustrating a process for the treatment of fractionated water according to one or more embodiments of the present disclosure.

The embodiments set forth in the drawings are illustrative in nature and not intended to be limiting of the invention defined by the claims. Moreover, individual features of the drawings and invention will be more fully apparent and understood in view of the detailed description.

Skilled artisans appreciate that elements in the figures are illustrated for simplicity and clarity and have not necessarily been drawn to scale. For example, the dimensions of some of the elements in the figures may be exaggerated relative to other elements, as well as conventional parts removed, to help to improve understanding of the various embodiments of the present invention.

DETAILED DESCRIPTION

Referring to the embodiment of FIG. 1, a flow diagram of a method for treating fractionated water is provided. The method comprises the steps of straining fractionated water to remove particles larger than one micron in diameter, and decanting the strained feed water to remove surfactants and oil. The process also includes the steps of evaporating the decanted water to provide a concentrated brine and water vapor and condensing the water vapor. As stated above, the fractionated water feed results from hydraulic fracturing of oil-gas wells. The fractionated water 30 may comprise various concentrations of dissolved solutes. In one or more embodiments, the fractionated water 30 comprises a solute concentration ranging from about 100,000 to about 300,000 ppm, or from about 150,000 to about 200,000 ppm.

In one configuration, fractionated water 30 may be strained with at least one strainer 150. The strainer 150 is operable to remove solids, such as iron, rock, sand, and oil from the fractionated water 30 to produce strained water 32. In one possible configuration, the strainer 150 can remove particles larger than 1 micron in size. Alternatively, it is also contemplated that the strainer 150 may be used to remove particles larger or smaller than 1 micron in size, depending on the composition of the fractionated water 30. The strained water 32 may be pumped by at least one feed pump 152, and sent to a decanter unit 154 for further processing.

The feed pump 152 may be used to send the strained water 32 from the strainer 150 to the decanter unit 154. While various pump capacities are contemplated, the feed pump 152 may typically have a capacity ranging from about 20 to about 200 gallons per minute (gpm). Alternatively, it is also contemplated that the feed pump 152 may have other capacities to suit the demands of the process and apparatus disclosed herein.

The decanter unit 154 may receive the strained water 32 from the feed pump 152. The decanter unit 154 may heat the strained water 32 to separate the recovered oil-surfactants 34 from the decanted water 46. Upon heating, the recovered oil-surfactants 34 are transferred from the decanter unit 154, and stored in at least one holding tank for later processing or recycling. The recovered oil-surfactants 34 may include, but are not limited to, guar, weak acids, polymers, and oils.

The decanter unit 154 may be heated using a variety of heating methods. In one exemplary embodiment, the decanter unit 154 may comprise a jacketed decanter, with the desired heat exchange fluid circulating throughout the jacket. Alternatively, the decanter unit 154 may be heated with other heat sources commonly known in the art. Upon heating of the decanter unit 154, the fluid used to heat the unit is emitted as a decanter condensate 36.

The concentration of the decanted fluid 46 may vary depending on the operating conditions of the decanter unit 154, and the concentration of the strained water 32 supplied. The concentration of the decanted fluid 34 may ranges from about 200,000 ppm to about 250,000 ppm of total dissolved solutes, or from about 225,000 to about 235,000 ppm of total dissolved solutes. However, other concentrations are also contemplated.

In one aspect, a portion of the decanter condensate 36 is emitted to a collection bin as a condensate stream 38. The condensate stream 38 may comprise liquid water stream, having a low concentration of total dissolved solutes. The condensate stream 38 may comprise water after condensation having a concentration ranging from about 0 to about 300 ppm with a pH ranging from about 5 to 8, or from about 70 to about 225 ppm with a pH ranging from about 6 to about 7. However, it is also contemplated that the condensate stream 38 has other concentrations and pH levels other than the ranges disclosed above. In another aspect, the condensate stream 38 has a concentration suitable for discharge into the environment. Accordingly, the apparatus is a zero air discharge design, meaning no vapor is emitted from the process, and no environmental or air permits are required for operation.

The decanter unit 154 may be operated at a temperature sufficient to separate the recovered oil-surfactants 34 from the other components in the strained water 32. The temperature necessary to remove the recovered oil-surfactants 34 from the decanter unit 154 may vary depending on the composition of the strained water 32. The decanter unit 154 may be operated at a temperature ranging from about 90 to about 120° F. The decanter unit 154 may also be operated at a temperature ranging from about 100 to about 110° F. However, it is also contemplated that the decanter unit 154 may be operated at other temperatures.

Referring again to FIG. 1 and as discussed above, a preheater 156 may be used to further heat the decanted water 46 from the decanter unit 154 to increase the temperature before additional processing. The preheater 156 may comprise a standard shell and tube heat exchanger. Alternatively, the preheater 156 may comprise other devices suitable to heat the fluid. The heat may be provided to the preheater in a variety of ways. In one aspect, the preheater 156 is heated through contact with other process streams emitted from downstream unit operations. The preheater 156 outputs a preheated stream 50, which is transferred to at least one filter 158. In one or more embodiments, the preheated stream 50 may be provided at a temperature ranging from about 80 to about 120° F., or from about 90 to about 110° F. However, it is also contemplated that the preheated stream 50 may be provided at other temperatures for use in the processes and methods described herein.

In one configuration, the preheater condensate 48 is used to heat decanter unit 154 to improve efficiency. After the available heat is transferred from the preheater condensate 48, the liquid exits the decanter unit 154 as decanter condensate 36.

Referring to FIG. 1, the preheated stream 50 is transferred from the preheater 156 to at least one filter 158 for further processing. The filter 158 receives the preheated stream 50 and filters out any remaining solids, and hydrocarbon droplets to produce a filtrate 52. The filtrate 52 may be transferred to the first evaporator 160 for further processing. In one configuration, the filter 158 comprises a bag type filter. It is contemplated that the filter 158 may have an effective filtration dimension operable to filter out any remaining solids, and hydrocarbon droplets. In another configuration, it is contemplated that the filter 158 comprises an alternative type of filter device suitable for use in combination with the device and process described herein to remove any remaining solids and hydrocarbon droplets.

The first evaporator 160 may evaporate additional water from the filtrate 52 to produce a brine-steam mixture 56. The first evaporator 160 produces the brine-steam mixture 56 and it is then pumped to the evaporator kettle 162 for additional evaporation. The first evaporator 160 may comprise a device suitable to evaporate water from the filtrate 52. In one configuration, the first evaporator 160 comprises a heated vessel. Alternatively, the first evaporator 160 may comprise other types of evaporators suitable to remove additional water vapor from the filtrate 52, such as a heat exchanger. In one configuration, the first evaporator 160 may be operated at a temperature ranging from about 210 to about 270° F., or from about 225 to about 255° F. However, it is also contemplated that the first evaporator 160 may be operated at other temperatures suitable to evaporate additional solution.

In one embodiment, the first evaporator 160 is heated by heat exchange with the kettle vapor 60 and a stream of circulating hot oil, through circulation through a heat exchange mechanism, and produce a first evaporator condensate 160.

In one embodiment, the brine steam mixture 56 is transferred to the evaporator kettle 162 at a temperature ranging from about 130 to about 160° F., or from about 140 to about 150° F. However, it is also contemplated that the temperature of the brine-steam mixture 56 may vary depending on the configuration of other devices in the process.

In one or more embodiments, the level of total dissolved solutes present in the brine-steam mixture 56 ranges from about 200,000 to about 250,000 ppm, or from about 215,000 to about 235,000 ppm. However, other levels of total dissolved solutes are contemplated in the brine-steam mixture 56. The brine-steam mixture 56 may be provided at a range of temperatures.

As shown in FIG. 1, the evaporator kettle 162 receives the brine-steam mixture 56 from the first evaporator 160. The evaporator kettle 162 further heats the brine-steam mixture 56 to remove additional water. Therefore, the salt concentration within the brine steam mixture 56 is further concentrated within the evaporator kettle 162 upon removal of the kettle recycle 58. In one embodiment, the evaporator kettle 162 receives heat from a circulating hot oil from a hot oil system 178; however, various other heat sources are also contemplated.

In another embodiment, the evaporator kettle 162 may comprise a heated vessel. The evaporator kettle 162 may also comprise a fluidly connected heat exchanger and vessel. Alternatively, the evaporator kettle 162 may comprise other types of reactors suitable to evaporate water from the brine-steam mixture 56. It is understood that the term "kettle" is not intended to limit the structure of the unit to a kettle structure; rather, it is used descriptively to indicate one potential configuration of the evaporation unit. In one embodiment, the evaporator kettle 162 may operate at a flow rate ranging from about 0 to about 50 gpm of the brine-steam mixture 56. In another embodiment, the evaporator kettle 162 may be operated at a flow rate ranging from about 10 to about 30 gpm. Alternatively, it is also contemplated that the evaporator kettle 162 may be operated at other flow rates. The evaporator kettle 162 may be operated at a range of temperatures suitable to produce the desired composition of the salt stream 62. In one exemplary embodiment, the evaporator kettle 162 is operated a temperature ranging from about 200 to about 270° F., or from about 220 to about 250° F. However, it is also contemplated that the evaporator kettle 162 may be operated at other temperatures.

Figure 2:
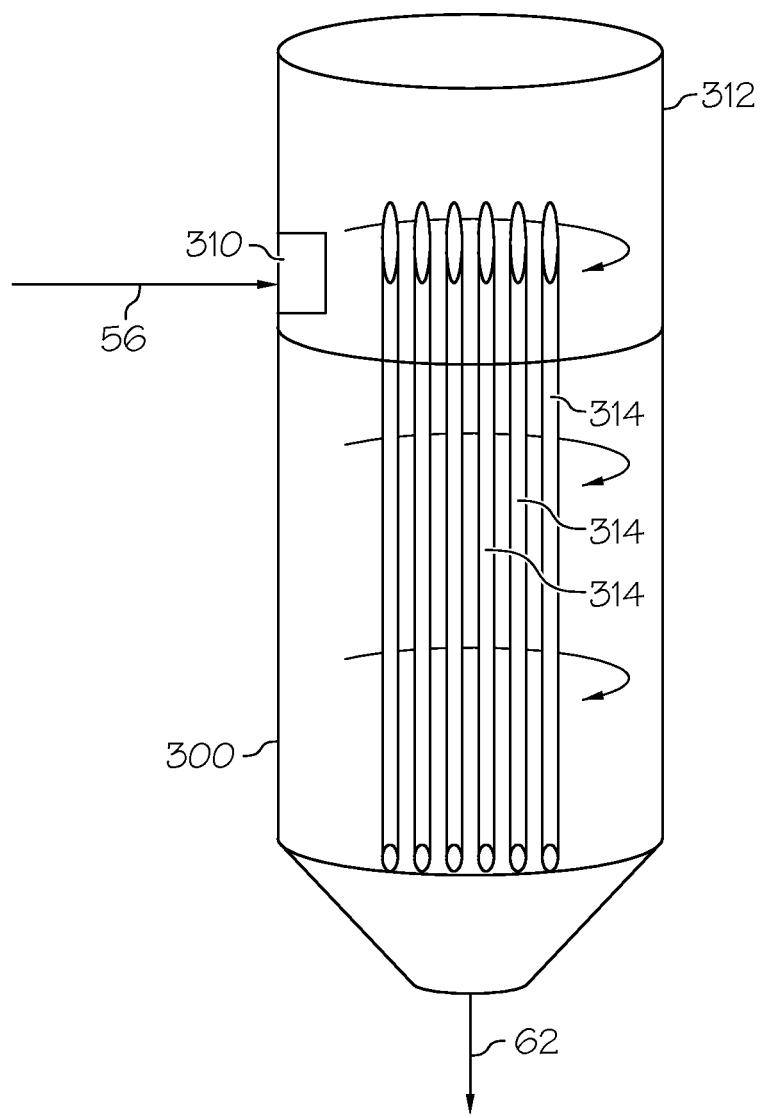
FIG. 2 shows a heat exchanger to be utilized in conjunction with the process illustrated in FIG. 1 in accordance with another embodiment.

Referring to FIG. 2, in one embodiment, the evaporator kettle 162 may comprise a heat exchanger 300 outfitted with a tangential feed unit 310 to prevent accumulation of solutes on the input of the evaporator kettle 162. The tangential feed unit 310 is disposed in a head unit 312 mounted on an end of a vertically mounted heat exchanger unit, a tube sheet 314 fluidly connected to the tangential feed unit. In one embodiment, the tangential feed unit 310 is an input tube that provides fluid to the outer wall of the head unit 312, such that the fluid is swirled in a circular motion as it traverses vertically along the tube sheet 314.

In yet another embodiment, the brine-steam mixture 56 enters the tangential feed unit 310, which directs the brine-steam mixture 56 to swirl in a circulation motion as it traverses vertically along the tube sheet 314. The circular motion allows a thinner sheet of brine-steam mixture 56 to coat the tube sheet 314, while traversing in a downward direction. By this motion, and the resultant coating of the tube sheet 314, most of the brine-steam mixture 56 will flash and evaporate, and allow the dissolved solids and salt to separate, and settle to the bottom of the evaporator kettle 162. Additionally, the circulation of the brine-stream mixture 56 washes the tube sheet 314 which serves to keep it substantially free of accumulated solutes and salts.

Referring again to FIG. 1, the evaporator kettle 162 may be operated in a variety of modes, to produce different compositions of a brine/salt mixture depending on the needs of the user. If a user desires a solid salt product, the evaporator kettle 162 may be operated until salt precipitates to the bottom of the evaporator kettle 162 and is removed by the salt concentrate pump 166 as a salt stream 62 which contains precipitated salt and brine. The salt stream 62 may comprise a composition ranging from about 60 to about 80 wt. % water. Alternatively, the salt stream 62 may comprise a composition ranging from about 65 to about 75 wt. % water. However, it is also contemplated that the salt stream 62 may comprise other mixtures for use in the process disclosed herein.

In another embodiment, if a user desires only a concentrated brine and permeated water, the evaporator kettle 162 is operated so that a salt stream 62 is produced, without substantial precipitation and subsequently transferred as recovered brine 66 is removed from the evaporator kettle 162 before the saturation point of the mixture is reached. Furthermore, as brine is concentrated within the evaporator kettle 162, a kettle recycle 58 is removed, and transferred to an entrainment separator 164, as further described below. The recovered brine 66 may have a concentration of total dissolved solids ranging from about 230,000 to about 300,000 ppm, or from about 250,000 to about 280,000 ppm. However, it is also contemplated that the recovered brine 66 may comprise other concentrations of total dissolved solutes. The recovered brine 66 may be reused in an oil-gas well. Alternatively, the recovered brine 66 may be used for other commercial and industrial uses.

Referring to another embodiment as shown in FIG. 1, the circulating pump 174 may receive recycled brine 64 from the evaporator kettle 162 and transfer it to the circulation filter 172. The circulation filter 172 receives a portion of the recycled brine 64 from the circulating pump 174; and it receives a portion of the residual water stream 76 transferred by the water recycle pump 170, along with additional feed water 74. In one configuration, the circulation filter 172 is a bag filter. However, other types of filtering devices may also be used in conjunction with the process. It is contemplated that the circulation filter 172 may have an effective filtration dimension operable to filter out any remaining solids, and hydrocarbon droplets. In another configuration, it is contemplated that the circulation filter 172 comprises an alternative type of filter device suitable for use in combination with the device and process described herein to remove any remaining solids and hydrocarbon droplets.

Referring to FIG. 1, the circulating evaporator 176 receives the brine makeup 78 from the circulation filter 172. The circulating evaporator 176 may be heated by a hot oil stream provided by a hot oil system 178. Alternatively, the heat may be supplied to the circulating evaporator 176 in a variety of different ways. The circulating evaporator 176 vaporizes a portion of the water in the brine makeup 78 to further concentrate the mixture, and then transfers the brine makeup 78 to the evaporator kettle 162 for further evaporation. The circulating evaporator 176 may comprise a variety of reactor types suitable to evaporator water from the brine makeup 78. Furthermore, the circulating evaporator 176 may be heated with a variety of different heating sources.

In one embodiment, both a first evaporator 160 and an evaporator kettle 162 are used in conjunction with the disclosed method and apparatus. In one configuration, the first evaporator 160 and evaporator kettle 162 are operated in series in order to provide a salt stream 62.

In another aspect, the entrainment separator 164 may be used to separate the kettle recycle 58 of the evaporator kettle 162 into its different components. Particularly, the entrainment separator 164 may separate the brine portion from the vapor portion of the kettle recycle 58. The entrainment separator 164 may send the kettle vapor 60 back to the first evaporator 160 for heating, and then the first evaporator condensate 54 may be mixed with a surplus hot water stream 44 and transferred to the preheater inlet 56. The entrainment separator 164 may comprise a device suitable to separate the brine and steam from the kettle recycle 58. The entrainment separator 164 may be a centrifugal force type entrainment separator. The brine separated from the entrainment output 60 may be transferred back to the evaporator kettle 162.

In another embodiment, a dewatering conveyor 168 may receive a portion of the salt stream 68 from the salt concentrate pump 166, and dewater the salt stream 68 to produce a recovered salt stream 70 and a residual water stream 72. The dewatering conveyor 168 may comprise a device operable to compress the salt stream 68 to remove excess moisture and produce a recovered salt stream 70 substantially free of excess moisture. In addition, the dewatering conveyor 168 allows the residual heat of the salt stream 68 to provide sufficient heat to evaporate remaining moisture. In one embodiment, the dewatering conveyor 168 may be similar to the unit produced by Meyer Industries. However, other types and configurations of dewatering conveyors 168 are also contemplated for use within the methods and apparatuses disclosed herein. The recovered salt stream 70 may be transferred to large storage containers for shipping, or immediate use. The residual water stream 72 that is released by the dewatering conveyor 168 is transferred by the water recycle pump 170 to at least one circulation filters 172 for additional processing and recycling.

The surplus hot water tank 180 provides a storage basin for heating and storage of surplus hot water to be used throughout the treatment system. The surplus hot water tank 180 may receive a recycled condensate stream 40 from the decanter unit 154, and receives raw water 42 from an external source. The surplus hot water tank 180 may provide water at a temperature ranging from about 180 to about 212° F. In addition, the surplus hot water tank 180 may provide hot water at a temperature above 200° F. Hot water from the surplus hot water tank 180 is pumped by the hot water pump 182, to the preheater 156 for heat transfer to the decanted water 46. The surplus hot water tank 180 is heated by oil from the circulation of the hot oil system 178. Alternatively, it is also contemplated that a heat exchange fluid may be supplied continuously to the various unit operations, or through an on-demand basis.

A surplus hot water stream 44 may be mixed with the first evaporator condensate 54 to provide heat to the preheater 156. Alternatively, the surplus hot water tank 180 may be used to supply heat to the decanter 154, the first evaporator 160, evaporator kettle 162, or the circulating evaporator 176.

In one embodiment, as shown in FIG. 1, the hot oil system 178 works in conjunction with several operations of the recovery unit 20, where hot oil is passed through various hot oil elements to provide heat exchange to the various unit operations. The hot oil system 178 does not contact the brine water itself, but the hot oil system 178 is used to transfer hot oil, and resulting heat through the evaporator kettle 162, through a surplus hot water tank 180, the first evaporator 160 and through the circulating evaporator 176. The hot oil system 178 may be operated at a range of different fluid capacities, ranging from about 100 to about 1000 gallons per minute. However, it is also contemplated that the hot oil system 178 may have other capacities necessary to fulfill the heating requirements of the process.

In one embodiment, the hot oil system 178 may the commercial systems manufactured by Gaumer. Alternatively other hot oil system 178 configurations may also be used. The hot oil system 178 may also be heated with gasoline, in-field petroleum, or propane. The hot oil system 178 may also be heated with other conventional heating means as appreciated in the art. In one or more embodiments, the hot oil system 178 may be operated at a temperature ranging from about 200 to about 400° F., or from about 250 to about 350° F. However, it is also contemplated that the hot oil system 178 can be operated at other temperatures. Furthermore, it is also contemplated that the hot oil system 178 may be interchangeable with other conventional heating sources.

A programmable logic controller system (PLC) may be used to control, monitor, and record the operation of the apparatus and method of water treatment. The PLC may control and monitor the flow rates and volumes of the fractionated water 30, the feed pump 152, the decanter unit 154, the preheater 156, the first evaporator 160, the evaporator kettle 162, and salt concentrate pump 166. In addition, other components of the system may be monitored, and controlled with a PLC system. A PLC system may also be used to monitor the conductivity of the different streams to ensure that the recovery unit is operating properly. A PLC system may also be used to monitor the water quality output of the condensate stream 38 to ensure proper separation by monitoring the TDS of the stream.

In yet another embodiment, a portable filtration system is provided. The portable filtration system may comprise a moveable vehicle comprising a support surface. The apparatus discussed throughout the above disclosure may be configured to be mounted on the support surface. The portable filtration system is sized to fit on a road trailer and comply with regulatory weight limits. Alternatively, the portable filtration system can be disposed on any portable surface, such as a moveable platform, truck, or trailer. Also, the recovery unit weighs less than the maximum weight limits tolerated by public roads, and may be transported on a road trailer or vehicle. For example, the filtration system described herein may weigh between 40000 lbs and 93000 lbs.

Various sizes are also contemplated for the filtration system. For example, the recovery unit may be sized to fit easily on mountain side mining sites. Moreover, the recovery unit may be sized to treat between about 100 barrels per day and about 5000 barrels per day or from about 200 to about 3000 barrels per day. In addition, it is also contemplated that the various capacities of the unit operations disclosed herein may be adjusted to achieve a desired production capacity.

It is further noted that terms like "preferably," "generally," "commonly," "desirably", and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is additionally noted that the terms "substantially" and "about" are utilized herein to represent the inherent degree of uncertainty that may be attributed to any quantitative comparison, value, measurement, or other representation. The terms "substantially" and "about" are utilized herein to represent the degree by which a quantitative representation may vary from a stated reference without resulting in a change in the basic function of the subject matter at issue.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

I claim:

1. An apparatus for water treatment comprising:
    a strainer and a decanter, the strainer in fluid communication with the decanter, and wherein the decanter provides heat to strained water from the strainer to separate oil-surfactants from the strained water;
    a feed pump in fluid communication between the strainer and the decanter, wherein the feed pump transfers strained water from the strainer to the decanter;
    an evaporator in fluid communication with the decanter;
    an evaporator kettle in fluid communication with evaporator, wherein the evaporator kettle comprises a heat exchanger comprising a tangential feed unit and a vertical tube sheet in fluid communication with the feed unit, wherein the tangential feed unit is an input tube that provides fluid from the evaporator such that the fluid is swirled in a circular motion as it traverses vertically along the tube sheet;
    a dewatering conveyor in fluid communication with the at least one evaporator kettle, the dewatering conveyor comprises a press for removing excess moisture from the brine; and
    a hot oil system circulating hot oil to said evaporator kettle and said first evaporator to provide heat exchange therewith.

2. The apparatus of claim 1, further comprising at least one filter in fluid communication with the decanter and the at least one evaporator, wherein the filter is disposed between the decanter and the evaporator.

3. The apparatus of claim 1, further comprising a collection tank in fluid communication with the evaporator kettle.

4. The apparatus of claim 1, further comprising a salt concentrate pump in fluid communication with the evaporator kettle.

5. The apparatus of claim 1, wherein the apparatus is configured as a zero air discharge design, discharging only water having a concentration of total dissolved solutes ranging from about 75 to about 225 ppm and salt product.

6. A portable filtration system comprising:
    a moveable vehicle comprising a support surface; and
    the apparatus of claim 1 disposed on the support surface.

7. The portable filtration system of claim 6, wherein the vehicle is a road trailer.

8. The apparatus of claim 1, further comprising an entrainment separator in fluid communication with the evaporator kettle and the evaporator=.

9. The apparatus of claim 8, further comprising:
    a circulation filter in fluid communication with the evaporator kettle;
    a circulating evaporator in fluid communication with the circulation filter and the evaporator;
    wherein said hot oil system further circulates hot oil to said circulating evaporator.

* * * * *